April 29, 1941.  H. T. LAMBERT  2,240,218
BRAKE CONSTRUCTION
Filed March 2, 1940    2 Sheets-Sheet 1
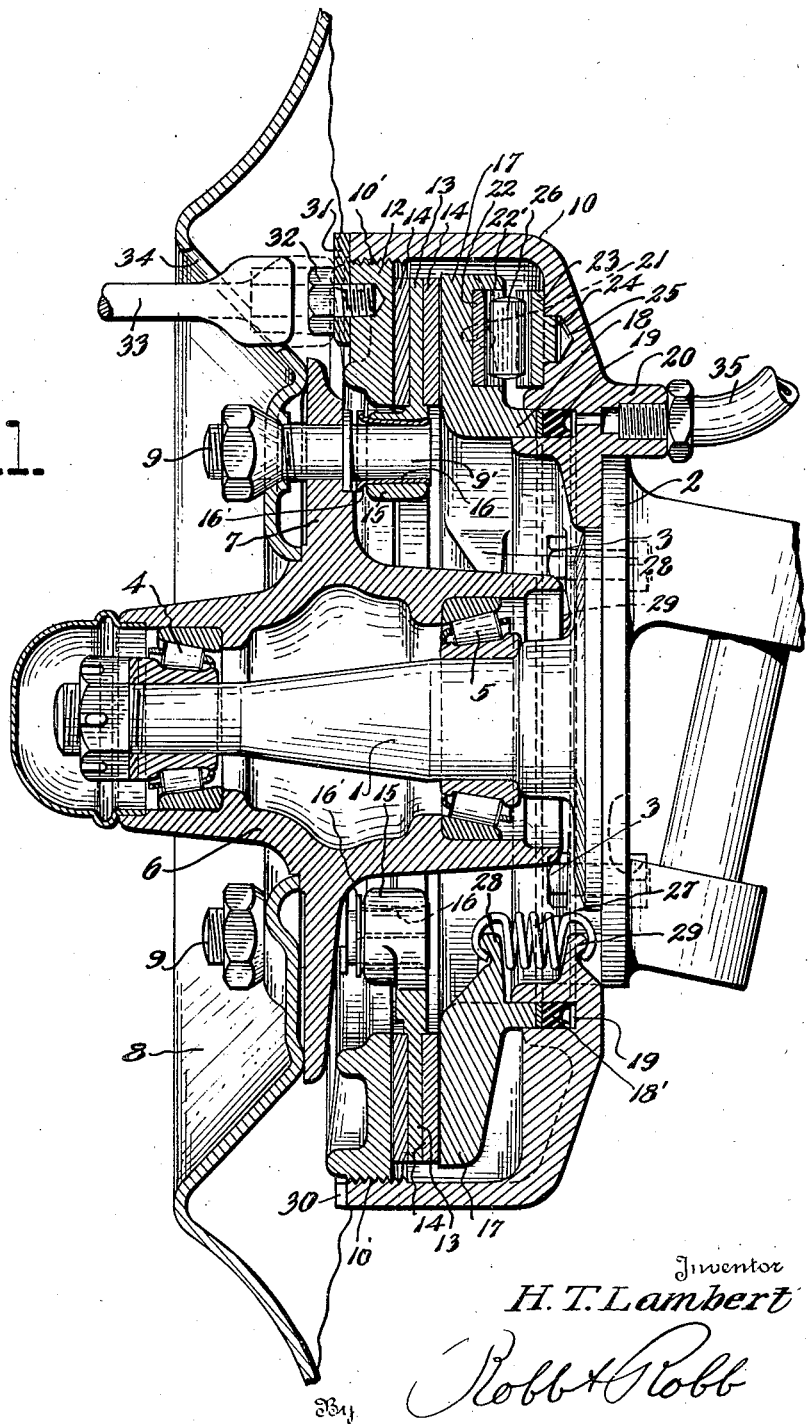

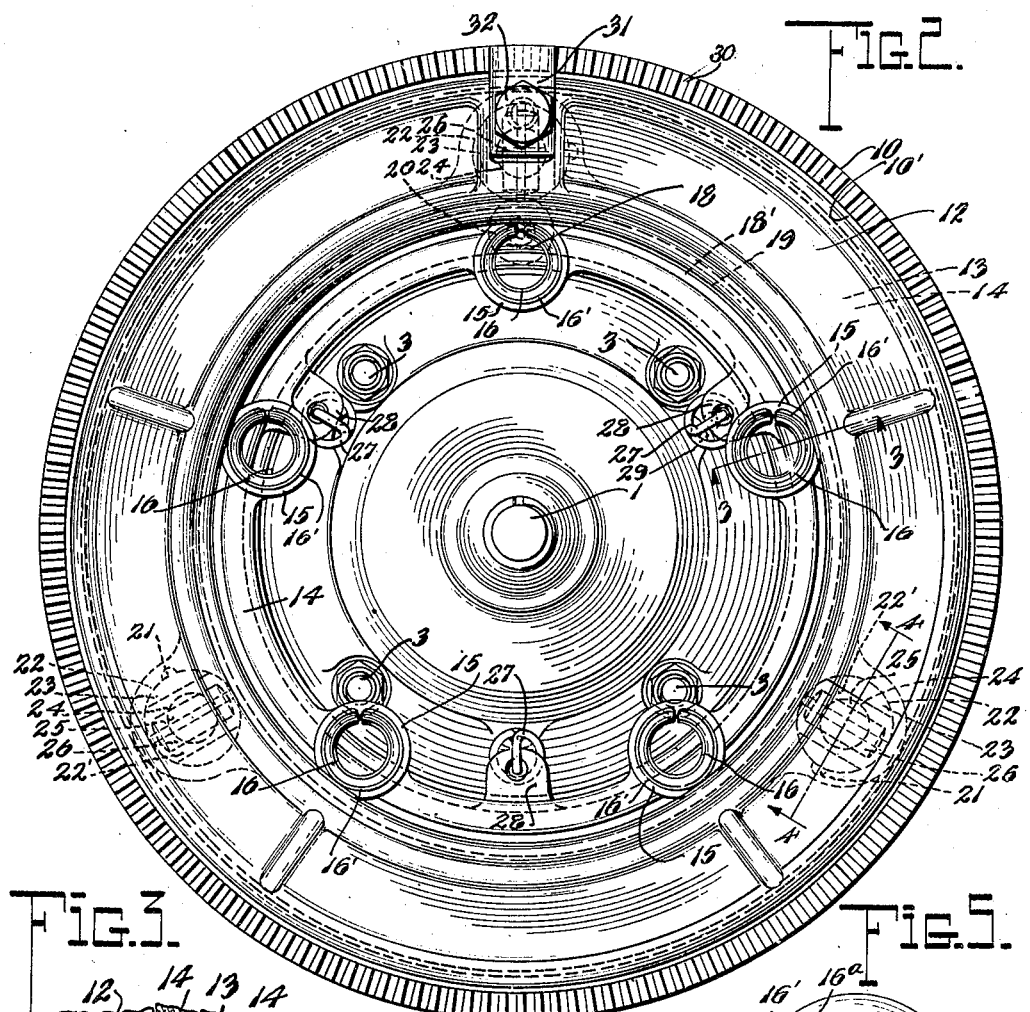

Patented Apr. 29, 1941

2,240,218

UNITED STATES PATENT OFFICE 2,240,218

BRAKE CONSTRUCTION

Homer T. Lambert, St. Joseph, Mich.

Application March 2, 1940, Serial No. 322,027

9 Claims. (Cl. 188—72)

The present invention relates to improvements in brake constructions of the self-energizing disc type as adapted particularly for application to automotive vehicles.

One of the primary objects of the invention is the production of a brake assembly capable of ready adaptation to automobiles of various types and embodying a simplified arrangement of parts that greatly facilitates adjustment, replacement or repair.

Another object in view is the provision of a novel mounting for the brake member of the unit, such that it may be easily and quickly adjusted to take up wear without disassembling the brake mechanism or dismounting of the vehicle wheel.

A further object of the construction is the provision of locking means for holding the adjustable brake member against accidental displacement, said means being so constructed and arranged as to afford a connection to the brake member for an instrument inserted through the vehicle wheel, by means of which latter the adjustment of the brake member may be effected.

Of prime importance, however, is the construction and arrangement of the parts by virtue of which the pressure stresses imparted to the relatively stationary brake member are so taken up as to prevent the warpage of the braking elements or disc and thereby reduction of the area of frictional contact between the braking surfaces.

To this end, the invention includes a housing member with which the stationary brake disc is engaged at its periphery, and the arrangement of the auxiliary pressure producing means adjacent to the periphery of the pressure plate directly opposite the friction surfaces of the braking members.

Other and further objects and advantages of the invention will be hereinafter set forth and the novel features thereof defined by the appended claims.

In the drawings:

Figure 1 is a vertical sectional view through a brake construction and associated wheel in accordance with this invention;

Figure 2 is a side elevation of the brake device with the vehicle wheel removed;

Figure 3 is an enlarged fragmentary view showing the mounting of the brake ring upon the wheel studs and cooperating thimble bushings, and Figures 4 and 5 are detail views of the thimble bushing used for mounting the brake ring.

Like reference characters designate corresponding parts in the several figures of the drawings.

Referring to Figure 1, the numeral 1 designates the axle spindle constituting the front or dirigible stub axle of a conventional motor vehicle, said axle being formed with the attaching flange 2 to which the brake assembly is connected, (as by means of the bolts 3). The spindle carries outer and inner wheel bearings 4 and 5 upon which the hub 6 is mounted, and to the hub flange 7 is demountably attached the wheel 8, as by means of the stud bolts 9.

The brake assembly unit is mounted between the flanges 2 and 7 and comprises the drum housing 10, threaded internally at 10' to receive the brake disc 12 which in turn is correspondingly threaded exteriorly for adjustment inwardly and outwardly of the drum housing 10.

Within the drum the rotary brake ring 13 is mounted upon the inner extensions 9' of the stud bolts 9, said ring carrying a friction lining or surface material 14 at each side. The ring is formed with a series of bearing lugs 15, each provided with an aperture to receive the extensions 9' serving to guide the ring and impart rotation thereto.

In order to facilitate the axial sliding movement of the ring, a metallic thimble bushing or spring ferrule 16 is disposed in each opening of the driving lugs 15. In Figures 4 and 5, the construction of this ferrule is clearly shown to comprise a split sleeve, normally tapered longitudinally and having a flange 16' at one end and spaced upset protuberances 16a at the other end. As the ferrules are introduced into the openings of the lugs 15, the spring metal sleeve is compressed until the walls assume a substantially parallel position tending to hold the ring 13 in a true vertical position and insure free self-adjusting sliding movement upon the extensions 9' at all times, and a full face to face contact of the ring faces with the adjacent parts during braking operation. It will be observed in Figure 3 particularly that the opening in the driving lug 15 is slightly larger than the diameter of the thimble and the extension 9' which gives to the arrangement a resilient cushioning between the parts, tending to eliminate all rattle or noise which might otherwise occur in a loose metal to metal contact or mounting of the lugs upon the extensions. This particular form of bushing eliminates the necessity of employing yieldable rubber bushings which have a tendency to become inoperative and interfere to a certain extent with the free sliding movement of the brake ring.

Within the housing 10 at the side of the ring 13 opposite the brake disc 12 is arranged a free floating pressure plate 17 formed with the laterally extending annular flange 18 extending into an annular recess 19 in the inner face of the drum housing.

Since the brake construction herein described is of the hydraulic type, the flange 18 constitutes a piston and the recess 19 its cylinder. A channeled sealing reinforced rubber ring 18' cooperates with the flange 18 and the pressure medium is admitted to the cylinder through the nipple 20 so as to actuate the pressure plate 17 to move it axially until it contacts with the rotary brake ring 13, thereupon picking up rotation of the latter when the vehicle is moving and setting up servo action by instrumentalities now to be described.

As will be clearly seen by reference to Figure 1, the pressure plate 17 in one face is provided with a plurality of circular recesses 21 (one only appearing in this view, but as shown in Figure 2, preferably three of such recesses are formed) and in each of these recesses is fixed a hardened steel insert 22 having a transverse substantially V-shaped groove 22' therein. Each of such inserts is faced with a substantially corresponding insert 23 rotatably mounted on the inner face of the drum housing 10 by means of a centralizing boss 24 seating in a recess 25. This construction of insert I have found desirable for those that are intended to rotate, as there is less tendency for them to freeze or stick in their seats, and they produce less friction.

Between each pair of these discs is a roller 26 seating in the insert grooves. It will be understood that I do not wish to be restricted as regards the form of this energizer means.

Under normal conditions, the pressure plate 17 is held away from the braking ring 13 by means of the tension springs 27, each of which is connected at one end to a lug 28 on the plate, and at its other end to a corresponding lug 29 formed on the housing 10 in opposed relation to the lug 28. Any number of these tensioning elements may be employed for the purpose stated. It will also be obvious that spring arrangements of different form may be employed and arranged to coact with the pressure plate to function in the same manner as the springs 27, and, for this reason, I do not wish to be restricted to the particular type of tensioning means shown in the drawings.

As hereinbefore described, the brake disc 12 is screwed into the open end of the drum 10 to the proper position for cooperation with the braking ring 13. This mounting of the brake disc enables adjustment of this element for clearance between the braking parts, and once the adjustment has been obtained, the position of the brake disc 12 is maintained by a special locking feature which is now to be described. As shown clearly in Figure 2 of the drawings, the peripheral face of the drum housing 10 is notched to provide a series of locking teeth 30 extending completely about the drum edge. A locking plate 31 having at its free end teeth corresponding to the teeth 30 is secured by means of a bolt 32 passing through an aperture in its other end to the brake disc 12 having a threaded aperture therein to receive said bolt. In order to take up wear of the braking parts and maintain a proper clearance adjustment between the same, the locking plate 31 is released from the engagement of its teeth with those on the drum 10 by backing out the bolt 32. For this purpose, an implement in the nature of a socket-wrench 33 is introduced through an opening 34 in the wheel and engaged with the head of the bolt 32. By taking hold of the wheel after the bolt has been backed out sufficiently far to establish a clearance between the interengaging teeth, the brake disc 12 may be rotated inwardly or outwardly, as the case may be, by the turning action of the wheel itself. Thus, through the wrench or implement 33 a connection is established between the wheel and the brake disc 12 to produce the rotative movement, and due to the leverage which is provided by the wheel, the adjustment of the brake disc in the manner described is greatly facilitated, and without the necessity of removing the wheel for such purpose. After the adjustment has been reached, the wrench is then operated to reengage the locking plate 31 and secure the same in a tightened position for preventing any further movement of the brake disc during the normal operation of the braking elements.

The operation of the brake device will be clear from the foregoing description, and it suffices to say by way of summary that, when brake application is to be obtained, the pressure medium is admitted to the brake unit through the conduit 35 to act against the piston flange 18 of the pressure plate 17. The pressure moves the pressure plate into contact with the friction surface of the rotating brake ring 13, and thereupon the rotative movement of this part is picked up by the pressure plate. Slight rotary movement of the last-named plate causes the rollers 26 to climb up the cam faces of the insert elements 22 and 23 to thereby cause further axial movement of the pressure plate against the braking ring 13, which is axially moved also to contact with the brake disc 12 and provides the necessary braking action of the parts. Upon relief of the hydraulic pressure, the tension of the springs 27 pulls the pressure plate 17 away from the braking ring 13 and normalizes the brake construction. This braking operation, by virtue of the construction of the self-energizing parts, may be obtained in either direction of movement of the vehicle. The simplicity of the construction and arrangement of the parts, the accessibility of the same, and the facility with which adjustment may be secured to take up wear are of prime importance in the advantage attributable to these particular brake improvements.

These mechanical advantages, while of great weight, are more particularly supplemented by the functional improvement of the brake due to the elimination of the tendency to spring the discs occurring in those constructions of brake devices of this type where the sustaining or supporting instrumentalities for the discs are arranged radially inwardly of the said discs.

In the present construction, it will be observed the energizing means are arranged as closely to the periphery of the pressure plate 17 as feasible to produce great power while the reacting stresses or strains are transferred from the periphery of the disc 12 to the housing 10 and its support, thus maintaining the friction surfaces in parallel relation during the braking operation.

While the specific details of construction have been herein shown and described, the invention is not confined thereto as alterations may be made without departing from the spirit thereof as defined by the appended claims.

Having thus described my invention, what I claim as new and desire to secure by Letters Patent is:

1. In brake mechanism of the class described, the combination of a brake support, a rotary braking member associated therewith including a vehicle wheel, a relatively stationary brake member having threaded connection with said support and for adjustment of the stationary member relative to the rotary member, means for shifting one of said members into frictional contact with the other to produce braking effect, and means for rotating the stationary member on the support to adjust the same axially of the brake mechanism, said vehicle wheel constituting means for rotating the stationary member on the support to adjust the same.

2. A vehicle brake construction of the class described, comprising a brake support, a rotary braking member associated therewith, a relatively stationary brake member operatively connected to said support for adjustment toward or from the rotary member, means for effecting frictional contact between the rotary and stationary brake members to produce braking effect, and means for establishing connection between the vehicle wheel and the relatively stationary member to effect adjustment thereof on the brake support.

3. In combination, a vehicle wheel, an axle support therefor, a brake housing carried by said support, a relatively stationary brake member connected to said housing, a rotary braking member in said housing and connected with the wheel, means for shifting the rotary member into frictional contact with the stationary member to effect braking action, and means for establishing a connection between the wheel and stationary member for actuation in an axial direction to effect adjustment of the braking members.

4. In brake mechanism of the class described, the combination of an axle support, a wheel member carried thereby, a brake housing mounted on said support, a relatively stationary member mounted in the entrance to said housing, a rotary braking member adjacent to said stationary brake member, means for shifting the last-named member into frictional contact with the stationary brake member to produce braking effect, means for connecting said wheel member to said stationary brake member for adjusting the stationary brake member within the housing by the wheel member to adjust the same to take up wear and establish clearance between the braking members, and means for interlocking said stationary member with the housing to hold the stationary member at adjusted position.

5. In brake mechanism of the class described, an axle support, a brake device mounted thereon comprising a brake housing, a relatively stationary brake member having threaded connection with the brake housing adjacent the entrance thereof, a rotary break member, means for shifting the rotary member axially into frictional contact with the stationary member to produce braking effect, a locking device connected to said stationary member and having means to interengage with the brake housing at the entrance thereof to hold said stationary member at adjusting position, said locking device comprises a locking plate having teeth to interengage with the brake housing and a fastening member connecting said plate with the stationary member.

6. In a brake construction of the class described, the combination of an axle support; a wheel member mounted thereon, including a hub; means for detachably connecting the wheel to the hub; a brake device mounted on said axle support adjacent the wheel and including a brake housing, a rotary brake member mounted upon the connecting means between the hub and wheel for rotation of said braking member with the wheel, a brake disc operatively connected with the brake housing for movement inwardly and outwardly of said housing to establish adjustment with relation to the rotary braking member; and means engageable with the brake housing for holding said stationary brake member at adjusted position; and means insertible through the wheel into engagement with the locking device for establishing a connection between said wheel and said stationary brake member, whereby the latter may be rotated by rotation of the wheel for effecting adjustment of the stationary member.

7. A vehicle brake construction, comprising an axle support, a drum housing connected to said support, a rotary braking member in said housing, studs for connecting said rotary member with the vehicle wheel and upon which said rotary member is mounted by apertured driving lugs, yieldable metallic bushings in the apertures of the driving lugs for cushioning the connection of said lugs with the wheel studs, a relatively stationary brake member mounted in said drum housing at one side of said rotary braking member, a pressure plate at the opposite side of said rotary braking member, means for actuating said plate in an axial direction to establish frictional contact with the rotary braking member, and torque-actuated means for producing additional pressure between the braking members.

8. A brake construction as set forth in claim 7, combined with a spring means intermediate the pressure plate and the drum housing for tensioning the pressure plate away from the rotary braking member.

9. A brake construction of the class described, comprising an axle support; a brake drum housing connected to said support and having the entrance thereof internally threaded; a brake disc peripherally threaded to engage the housing threads for adjustment of the brake disc inwardly and outwardly of the housing; a locking detent carried by said brake disc and engageable with the housing for holding the brake disc at adjusted positions; a rotary braking ring adjacent the brake disc and axially movable toward and from the same; a pressure plate coacting with the rotary braking ring and having means for mounting it upon the brake housing, said pressure plate being slightly rotatable and axially shiftable relative to the braking ring; torque-actuated means intermediate the pressure plate and the brake drum housing, including hardened inserts fixedly connected in the pressure plate, cooperative hardened inserts having bosses extending therefrom and received in recesses in the brake housing, and roller elements coacting with each pair of inserts; and spring members connected with the pressure plate and the drum housing tending to normally hold the pressure plate away from the braking ring.

HOMER T. LAMBERT.